US009058424B1

(12) United States Patent
Bienkowski et al.

(10) Patent No.: US 9,058,424 B1
(45) Date of Patent: Jun. 16, 2015

(54) AUTOMATIC UNIT TEST GENERATION AND EXECUTION

(71) Applicant: The MathWorks, Inc., Natick, MA (US)

(72) Inventors: Joseph R Bienkowski, East Longmeadow, MA (US); David M. Saxe, Stow, MA (US); Richard M. McKeever, Springfield, MA (US); John E. Booker, Jamaica Plain, MA (US); Andrew T. Campbell, Medway, MA (US)

(73) Assignee: The MathWorks, Inc., Natick, MA (US)

( * ) Notice: Subject to any disclaimer, the term of this patent is extended or adjusted under 35 U.S.C. 154(b) by 182 days.

(21) Appl. No.: 13/662,713

(22) Filed: Oct. 29, 2012

(51) Int. Cl.
G06F 9/44 (2006.01)
G06F 11/36 (2006.01)

(52) U.S. Cl.
CPC .................................. *G06F 11/3668* (2013.01)

(58) Field of Classification Search
USPC .................................................... 717/127, 131
See application file for complete search history.

(56) References Cited

U.S. PATENT DOCUMENTS

| 6,865,731 | B2* | 3/2005 | Davia et al. ............... 717/127 |
| 7,093,234 | B2* | 8/2006 | Hibbeler et al. ........... 717/124 |
| 8,056,060 | B2* | 11/2011 | Bicheno et al. ............ 717/127 |
| 8,453,112 | B1* | 5/2013 | Brambley et al. .......... 717/110 |
| 8,584,079 | B2* | 11/2013 | Yassin et al. ............... 717/101 |
| 2005/0091003 | A1* | 4/2005 | Wu ............................. 702/183 |

* cited by examiner

*Primary Examiner* — Hang Pan
(74) *Attorney, Agent, or Firm* — Harrity & Harrity, LLP

(57) ABSTRACT

A computing device may obtain usage information relating to an execution of a function within code. The usage information may include a set of input values and an output value obtained based on executing the function using the set of input values. The computing device may further determine that the function has been executed a particular quantity of times using the set of input values and obtaining the output value, and may generate a unit test, for the function, based on determining that the function has been executed the particular quantity of times using the set of input values and obtaining the output value.

21 Claims, 14 Drawing Sheets

| CODE INFORMATION 605 | PORTION INFORMATION 610 | | | | | | | |
|---|---|---|---|---|---|---|---|---|
| INPUT 615 | SOURCE 620 | OUTPUT 625 | FUNCTION 630 | EXECUTION QUANTITY 635 | RESOURCE 640 | TIME 645 | TEST 650 | CERTAINTY SCORE 660 |
| 2, 3 | USER1 | 6 | result = a * b | 1 | CYC Z | T1 | | |
| 2, 3 | USER1 | 5 | result = a + b | 1000 | CYC Y | T2 | CONCRETE | 100 |
| 4, 6 | USER1 | 10 | result = a + b | 50 | CYC Y | T3 | CONCRETE | 10 |
| 14, 16 | 205 | 30 | result = a + b | 50 | CYC Y | T4 | DYNAMIC | 2 |
| 100, 100 | 205 | 200 | result = a + b | 5 | CYC Y | T5 | DYNAMIC | 1 |
| ... | | | | ... | | | | |

FIG. 6

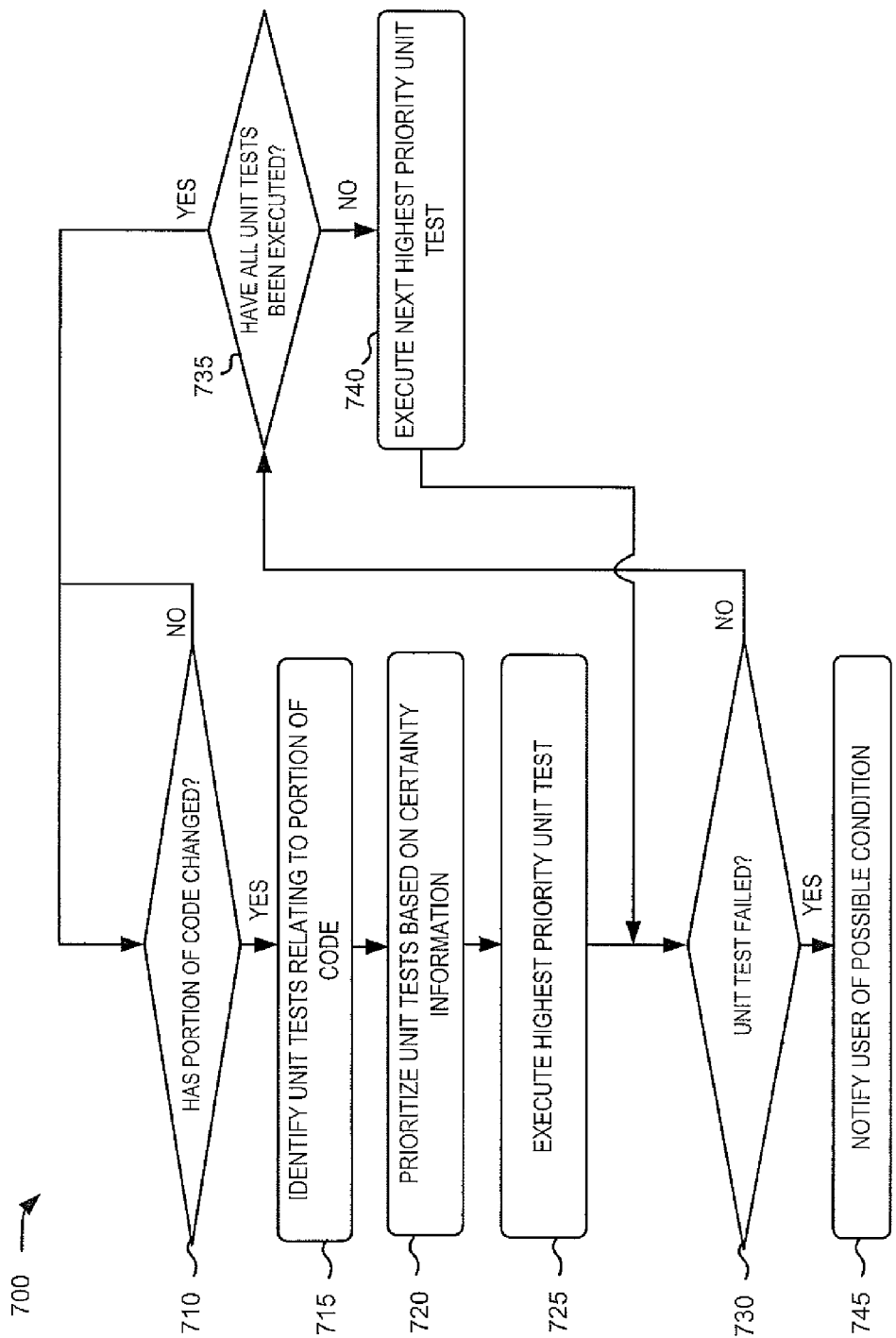

AUTOMATIC UNIT TEST GENERATION AND EXECUTION

BRIEF DESCRIPTION OF THE DRAWINGS

FIG. 6 is an example data structure that stores usage information associated with a portion of code;

FIG. 7 is a flow chart of an example process relating to executing a unit test;

FIGS. 8A-8C are example user interfaces via which a user may interact with a portion of code.

DETAILED DESCRIPTION

Figure 1A:
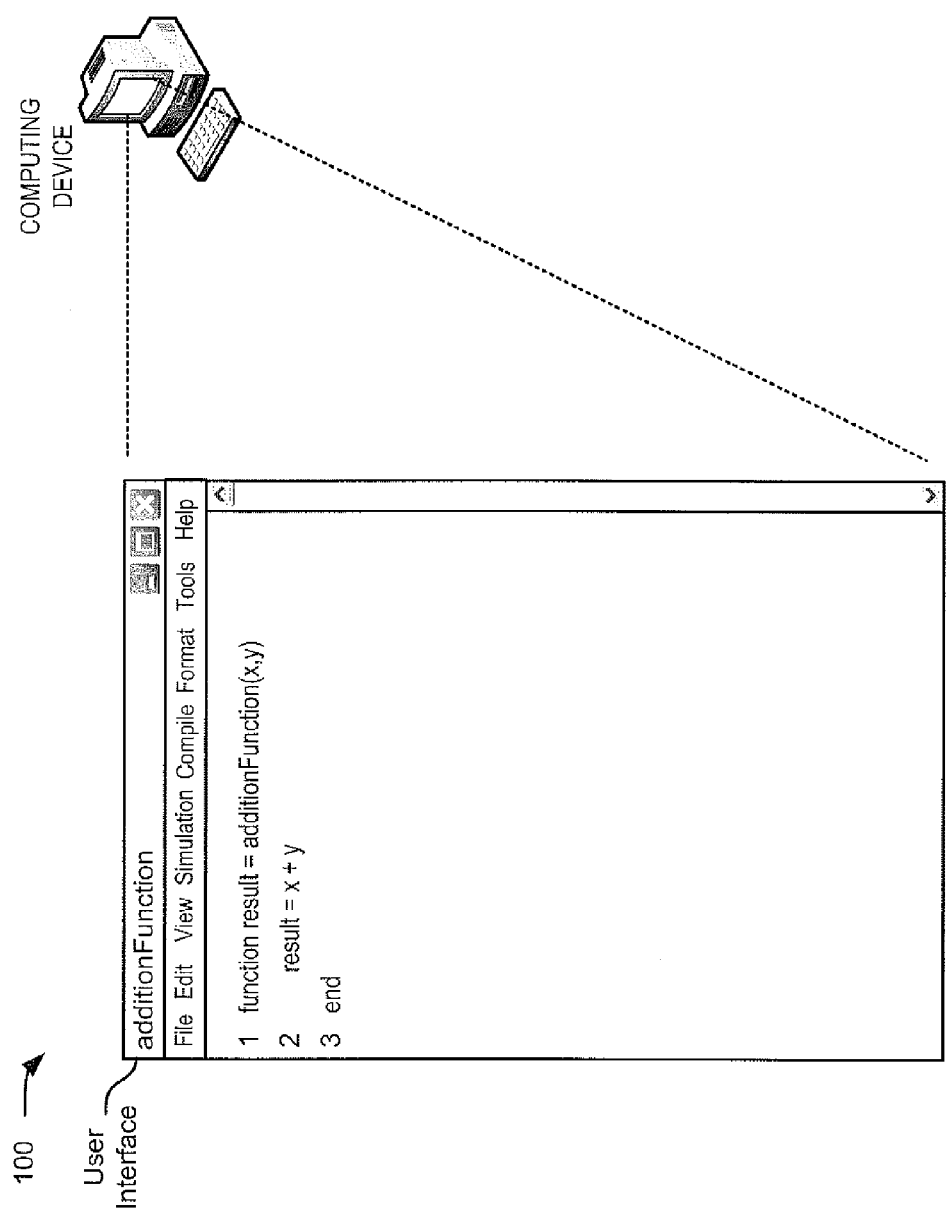
FIGS. 1A-1C are diagrams of an example overview of an implementation described herein.

The following detailed description refers to the accompanying drawings. The same labels and/or reference numbers in different drawings may identify the same or similar elements.

Systems and/or methods, described herein, may facilitate the debugging of code by a user. In some implementations, a computing device may identify a portion of code that is a good candidate for testing. The computing device may record information, such as inputs and outputs of the portion of code, when the portion of code is executed. Once the portion of code has been executed a number of times with the same inputs and the same output, the computing device may be able to determine, based on the recorded information, how the portion of code is to operate. Once enough information has been recorded, the computing device may automatically generate a unit test. In some implementations, the computing device may generate the unit test without the user's knowledge. Thereafter, each time the portion of code is changed, the computing device may run the unit test to detect potential bugs introduced into the portion of code. In some implementations, the computing device may run the unit test without the user's knowledge. If the unit test fails, meaning that a bug may have been introduced into the portion of code, the computing device may alert the user. In this way, the user may obtain debugging information while the user is creating or editing code.

Systems and/or methods, as described herein, may use a computing environment, such as a technical computing environment (TCE), for performing computing operations. A TCE may include any hardware and/or software based logic that provides a computing environment that allows tasks to be performed (e.g., by users) related to disciplines, such as, but not limited to, mathematics, science, engineering, medicine, and business. The TCE may include text-based environments (e.g., MATLAB® software), a graphically-based environment (e.g., Simulink® software, Stateflow® software, SimEvents® software, etc., by The MathWorks, Inc.; VisSim by Visual Solutions; LabView® by National Instruments; etc.), or another type of environment, such as a hybrid environment that may include, for example, one or more of the above-referenced text-based environments and one or more of the above-referenced graphically-based environments.

The TCE may be integrated with or operate in conjunction with a graphical modeling environment, which may provide graphical tools for constructing models or systems or processes. The TCE may include additional tools, such as tools designed to convert a model into an alternate representation, such as source computer code, compiled computer code, or a hardware description (e.g., a description of a circuit layout). In an implementation, the TCE may provide this ability using graphical toolboxes (e.g., toolboxes for signal processing, image processing, color manipulation, data plotting, parallel processing, etc.). In another implementation, the TCE may provide these functions as block sets. In still another implementation, the TCE may provide these functions in another way.

Models generated with the TCE may be, for example, models of a physical system, a computing system, an engineered system, an embedded system, a biological system, a chemical system, etc.

A model generated with the TCE may include, for example, any equations, assignments, constraints, computations, algorithms, and/or process flows. The model may be implemented as, for example, time-based block diagrams (e.g., via the Simulink software), discrete-event based diagrams (e.g., via the SimEvents software), dataflow diagrams, state transition diagrams (e.g., via the Stateflow software), software diagrams, a textual array-based and/or dynamically typed language (e.g., via the MATLAB software), and/or any other type of model.

As previously mentioned, an example implementation of the TCE may use one or more text-based products, such as textual modeling environments. For example, a text-based modeling environment, may be implemented using additional products such as, but not limited to Octave, Python, Comsol Script, and MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dynasim. In some implementations, the text-based modeling environment may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc.

In an implementation, the text-based modeling environment may include a dynamically typed language that may be used to express problems and/or solutions in mathematical notations. For example, the modeling environment may use an array as a basic element, where the array may not require dimensioning. These arrays may be used to support array programming in that operations can apply to an entire set of values, such as values in an array. Array programming may allow array-based operations to be treated as a high-level programming technique or model that lets a programmer think and operate on whole aggregations of data without having to resort to explicit loops of individual non-array, i.e., scalar operations.

The modeling environment may further be adapted to perform matrix and/or vector formulations that may be used for data analysis, data visualization, application development, simulation, modeling, algorithm development, etc. These matrix and/or vector formulations may be used in many areas, such as statistics, finance, image processing, signal processing, control design, life sciences, education, discrete event analysis and/or design, state based analysis and/or design, etc.

In another example implementation, the TCE may be implemented in a graphically-based modeling environment using products such as, but not limited to; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; or aspects of a Unified Modeling Language (UML) or SysML environment.

Figure 1B:
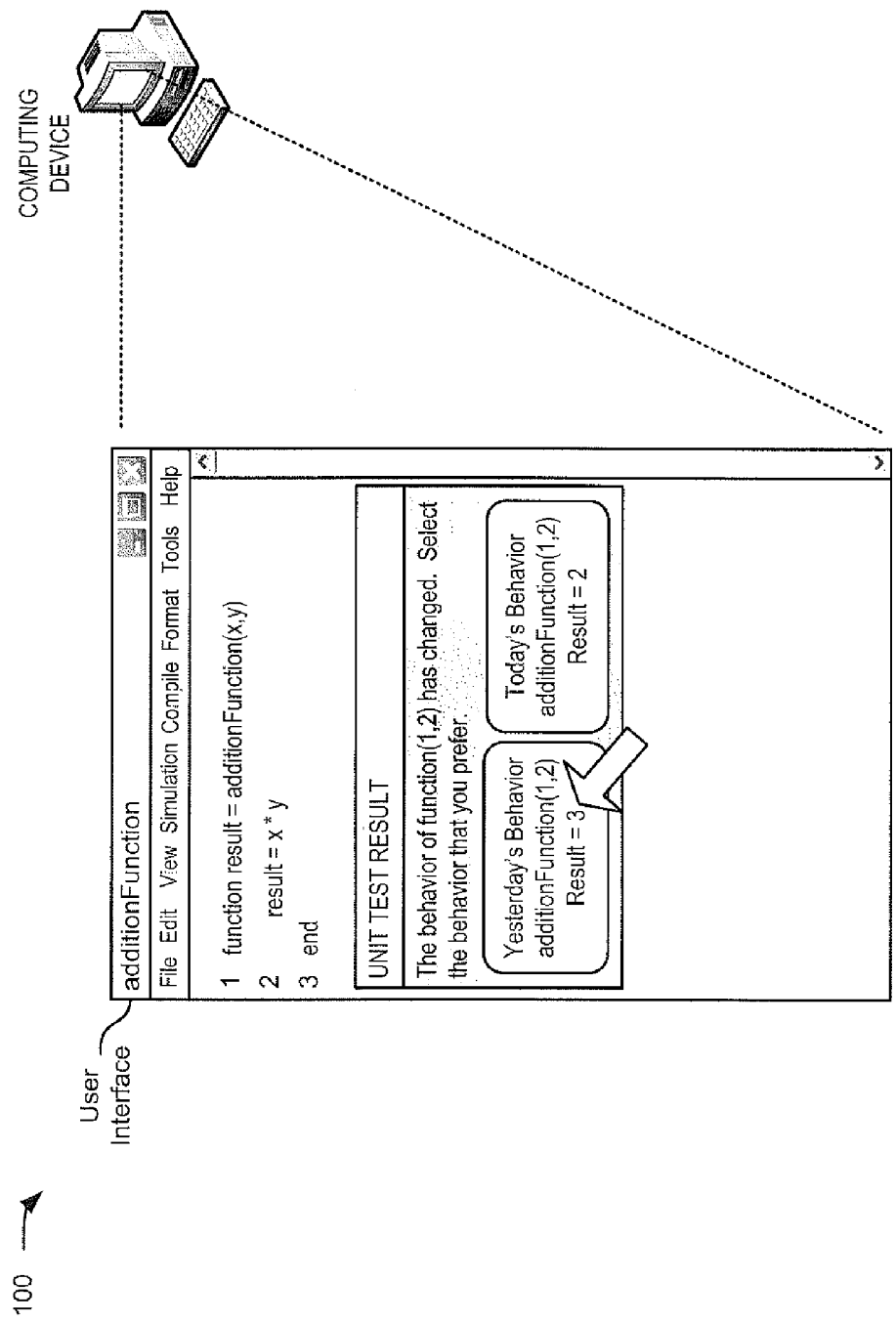
Figure 1C:
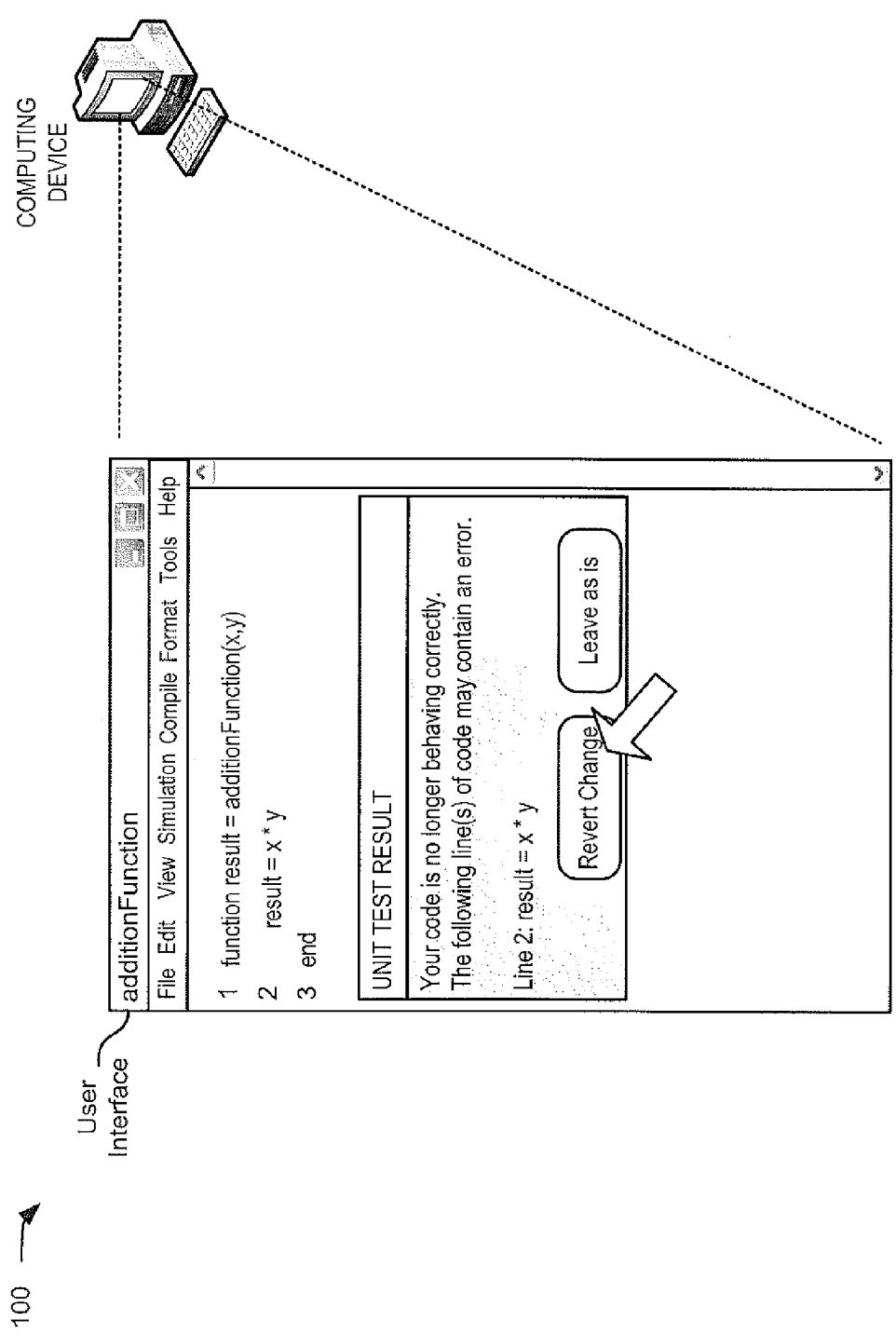

FIGS. 1A-1C are diagrams of an example overview 100 of an implementation described herein. Assume, for overview 100, that a user has added a function, called "additionFunction," to a portion of code, as illustrated in FIG. 1A. The function adds two variables, named "x" and "y," together to obtain an output, named "result." Assume further that, in creating the portion of code, the user has caused the computing device to execute the function a number of times with a value of "x" set to 1 and a value of "y" set to 2, and obtained a "result" of 3. The computing device may record information relating to the executions of the function. The recorded information may include, for example, information relating to the inputs to the function, information relating to the outputs of the function, information relating to the usage of resources when the function was executed, information relating to instances when the execution of the function failed, etc. The computing device may further generate a unit test, for the function, based on the recorded information. In some implementations, the recording of the information relating to the executions of the function and the generation of the unit test for the function may be performed automatically and without the user's knowledge.

With reference to FIG. 1B, assume that at some later point in time, the user has altered the portion of code, such that the function now multiplies the variables "x" and "y." The computing device may detect this change to the function and may automatically, and possibly without the user's knowledge, run the unit test. In so doing, the computing device may identify that the value of the output, named "result," has changed from a value of 3 to a value of 2. In this situation, the computing device may determine that the behavior of the function has changed and may alert the user, as illustrated in FIG. 1B. The alert may identify the change in behavior and may give the user the ability to revert back to the prior form of the function. In some implementations, the alert may identify the line(s) of code that caused the change in behavior of the function, as illustrated in FIG. 1C.

The automatic generation and execution of unit tests may enable a user to develop and/or troubleshoot code using less time and/or resources than is used to develop or troubleshoot code using manually created and/or executed unit tests. Thus, automatically generating and executing the unit tests may improve a user experience, and may save time and expense associated with creating or editing code.

Figure 2:
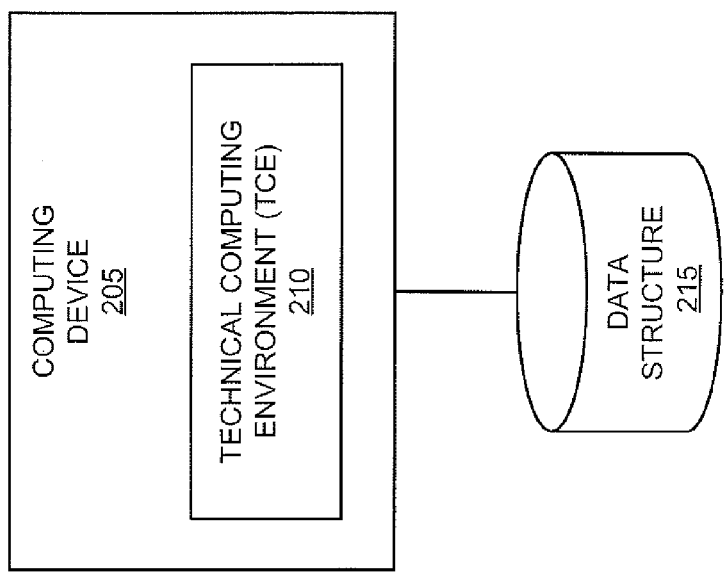
FIG. 2 is a diagram of an example environment in which systems and/or methods, described herein, may be implemented.

FIG. 2 is a diagram of an example environment 200 in which systems and/or methods, described herein, may be implemented. As illustrated, environment 200 may include a computing device 205 and a data structure 215.

Computing device 205 may include one or more devices that gather, process, search, store, and/or provide information in a manner similar to that described herein. For example, computing device 205 may include a server, a workstation, a mainframe, a computer (e.g., a desktop computer, a laptop computer, a tablet computer, etc.), and/or some other type of computational device. Computing device 205 may generate, compile, and/or execute code. Computing device 205 may generate unit tests for portions of the code and may execute one or more of the unit tests to identify one or more conditions associated with the portions of the code.

Computing device 205 may host a TCE 210. TCE 210 may include hardware-based logic or a combination of hardware and software-based logic that provides a computing environment. TCE 210 may permit a user to perform tasks related to a discipline or a domain. For example, TCE 210 may pertain to mathematics, science, engineering, medicine, business, and/or another type of discipline or domain in a manner similar to that described above. In some implementations, TCE 210 may be hosted by another device, such as a server, that is located remotely from computing device 205.

Data structure 215 may include one or more devices that store information used by computing device 205 to perform operations described herein. Data structure 215 may, for example, store code that is being or has been developed by a user of computing device 205. Data structure 215 may also, or alternatively, store information relating to execution of the code, unit tests that have been generated for testing the code, and/or other information relating to the development or testing of the code. In some implementations, data structure 215 may be directly connected to computing device 205. In some implementations, data structure 215 may be connected to computing device 205 via a network, such as the Internet. In some implementations, data structure 215 may be located within computing device 205.

Although FIG. 2 shows example components of environment 200, in some implementations, environment 200 may include additional components, fewer components, different components, or differently arranged components than those depicted in FIG. 2.

Figure 3:
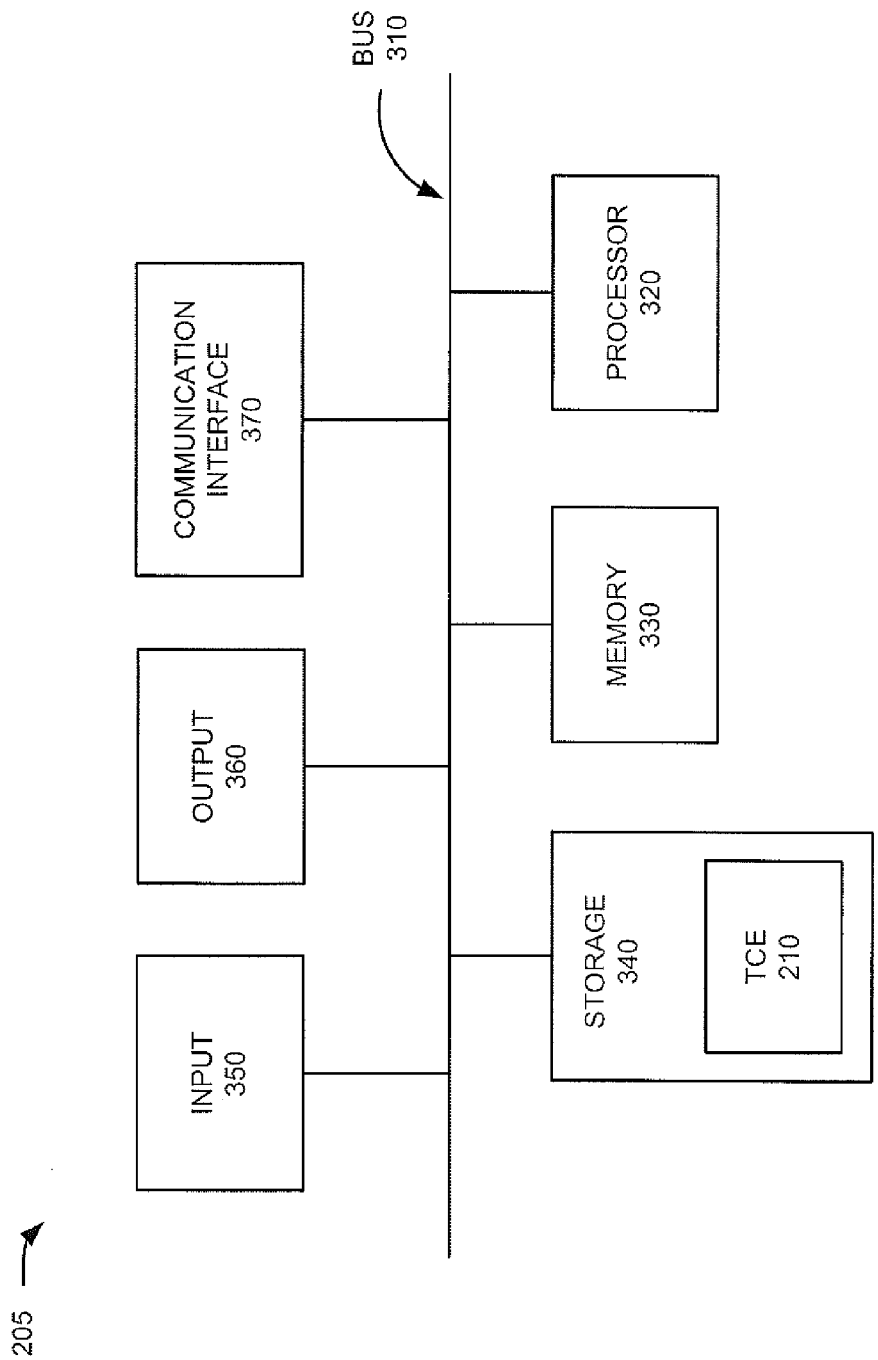
FIG. 3 is a diagram of example components of a computing device of FIG. 2 according to one or more implementations described herein.

FIG. 3 is a diagram of example components of computing device 205. As shown in FIG. 3, computing device 205 may include a bus 310, a processor 320, a memory 330, a storage 340, an input component 350, an output component 360, and/or a communication interface 370.

Bus 310 may permit communication among the other components of computing device 205. For example, bus 310 may include a system bus, an address bus, a data bus, and/or a control bus. Bus 310 may also include bus drivers, bus arbiters, bus interfaces, and/or clocks.

Processor 320 may interpret and/or execute instructions. For example, processor 320 may include a general-purpose processor, a microprocessor, a data processor, a graphical processing unit (GPU), a processing core, an application specific integrated circuit (ASIC), an application specific instruction-set processor (ASIP), a system-on-chip (SOC), a programmable logic device (PLD), a chipset, and/or a field programmable gate array (FPGA).

Memory 330 may store data and/or instructions related to the operation and use of computing device 205. For example, memory 330 may store data and/or instructions that may be configured to implement an implementation described herein. Memory 330 may include, for example, a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Storage 340 may store data and/or software related to the operation and use of computing device 205. For example, storage 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. Memory 330 and/or storage 340 may also include a storage device external to and/or removable from computing device 205, such as a Universal Serial Bus (USB) memory stick, a hard disk, etc. In an implementation, as illustrated, storage 340 may store TCE 210.

Input component 350 may permit the user and/or another device to input information into computing device 205. For example, input component 350 may include a keyboard, a keypad, a mouse, a display (e.g., a touch screen), a touchpad, a button, a switch, a microphone, a camera, an accelerometer, a gyroscope, neural interface logic, voice recognition logic, an input port, and/or some other type of input component. Output component 360 may permit computing device 205 to output information to the user and/or another device. For example, output component 360 may include a display, a speaker, a light emitting diode (LED), a haptic device, a tactile device, an output port, and/or some other type of output component.

Communication interface 370 may permit computing device 205 to communicate with other devices, networks, and/or systems. Communication interface 370 may include a transceiver-like component. For example, communication interface 370 may include an Ethernet interface, an optical interface, a coaxial interface, a radio interface, and/or some other type of wireless and/or wired interface.

As will be described in detail below, computing device 205 may perform certain operations relating to implementations described herein. Computing device 205 may perform these operations in response to processor 320 executing software instructions (e.g., computer program(s)) contained in a computer-readable medium, such as memory 330 and/or storage 340. A computer-readable medium may be defined as a non-transitory memory device. A memory device may include space within a single physical memory device or spread across multiple physical memory devices. The software instructions may be read into memory 330 from another computer-readable medium, such as storage 340, or from another device via communication interface 370. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of computing device 205, in some implementations, computing device 205 may include additional components, fewer components, different components, or differently arranged components than those depicted in FIG. 3. Additionally, or alternatively, one or more components of computing device 205 may perform one or more tasks described as being performed by one or more other components of computing device 205.

Figure 4:
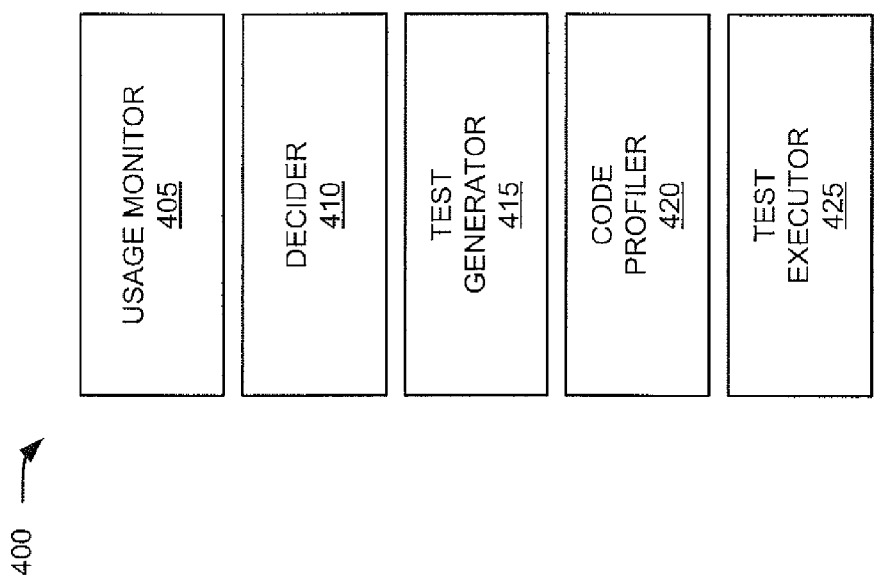
FIG. 4 is a diagram of example functional components of a computing device of FIG. 2 according to one or more implementations described herein.

FIG. 4 is a diagram of example functional components 400 of computing device 205 according to one or more implementations described herein. Components 400 may be implemented as a result of processor 320 executing instructions stored in memory 330. As shown in FIG. 4, functional components 400 may include a usage monitor component 405, a decider component 410, a test generator component 415, a code profiler component 420, and a test executor component 425.

Usage monitor component 405 may obtain usage information for a portion of code. The usage information may, for example, include input values, output values, and/or other types of information relating to the execution of the portion of code. The portion of code may, for example, correspond to a function or some other portion of code that accepts inputs and provides an output. In some implementations, usage monitor component 405 may monitor a command line that is being used by a user, associated with computing device 205, to create or edit the portion of code. Usage monitor component 405 may capture input values, generated by computing device 205 and/or entered into the command line by the user, and store the input values in association with information identifying the portion of the code. Usage monitor component 405 may also, or alternatively, capture one or more output values generated based on executing the portion of the code, using the input values, and may store the output values in association with the information identifying the portion of the code. In some implementations, usage monitor component 405 may request usage information from a user. For example, usage monitor component 405 may provide an interface, to the user, requesting information relating to the portion of code. The requested information may include, for example, input values for the portion of code, data types that the portion of code accepts as inputs, and/or other information relating to the portion of code that may be used to generate a unit test. Usage monitor component 405 may store the usage information in association with information identifying the portion of code.

Decider component 410 may determine whether to generate a unit test for a portion of the code, based on the usage information obtained by usage monitor component 405. For example, decider component 410 may determine that a unit test is to be generated for a particular portion of code based on the particular portion of code being executed more than a particular quantity of times with the same inputs and achieving the same output. The quantity of times may correspond to one or more times. Decider component 410 may alternatively determine that a unit test is to be generated based on one or more other factors. When decider component 410 determines that, based on the usage information, a unit test is to be generated, decider component 410 may send an indication to test generator component 415 indicating that the unit test is to be generated.

Decider component 410 may determine whether to execute a unit test based on detecting that a change has been made to the portion of code. Decider component 410 may alternatively determine whether to execute a unit test based on one or more other factors. When decider component 410 determines that a unit test is to be executed, decider component 410 may send an indication, to test executor component 425, indicating that a unit test is to be executed. When multiple unit tests are to be executed, decider component 410 may prioritize the unit tests and send an indication, to test executor component 425, as to the order in which the unit tests are to be executed.

Test generator component 415 may generate a unit test for a portion of code. For example, test generator component 415 may receive an indication, from decider component 410, that a unit test is to be generated for the portion of the code. Based on the indication, test generator component 415 may generate code, for the unit test, that, when executed, enables computing device 205 to perform a test on the portion of code to determine whether a potential condition is associated with the portion of code.

In some implementations, test generator component 415 may generate different types of unit tests for a portion of code. The different types of unit tests may include a concrete unit test and a dynamic unit test. A concrete unit test may include a unit test that is generated, for a particular portion of code, after the particular portion of code has been executed a particular quantity of times with the same user-provided input values and has achieved the same output value. The output value may correspond to a desired output value or an error. In those situations where the same input values for a particular portion of code result in the same error, test generator component 415 may enable computing device 205 to generate a concrete negative unit test. Additionally, or alternatively, a concrete unit test may include a unit test that is generated based on feedback from a user. For example, upon execution of the portion of code, test generator component 415 may provide a user interface that prompts the user to provide parameters for the portion of code, such as a range of permissible input values, permissible data types for the input values, etc. Test generator component 415 may then generate a concrete unit test based on the user-provided parameters.

A dynamic unit test may include a unit test that is generated, for a particular portion of code, based on inputs that were not provided by the user. For example, test generator component 415 may analyze the user-provided inputs to the particular portion of code and generate different inputs and/or different input data types to determine how the particular portion of code reacts to the different inputs and/or different input data types. Test generator component 415 may generate dynamic unit tests based on how the particular portion of code behaves in response to the different inputs and/or different input data types. Thus, test generator component 415 may generate and associate a number of different unit tests with a particular portion of code.

Code profiler component 420 may identify and/or track unit tests associated with the code. For example, code profiler component 420 may identify portions of code for which unit tests have been generated. Code profiler component 420 may also, or alternatively, identify other portions of the code for which unit tests have not been generated. Code profiler component 420 may identify a quantity of unit tests associated with the code; types of unit tests; a quantity of potential conditions associated with the code (e.g., based on executing the unit tests); types of the potential conditions; etc.

Code profiler component 420 may also, or alternatively, associate levels of certainty with the unit tests and/or test results based on the types of unit tests, times when the unit tests were generated and/or executed, etc. For example, code profiler component 420 may associate a higher level of certainty with a concrete unit test, for a particular portion of code, than a dynamic unit test for the particular portion of code since the concrete test is generated based on input values provided by the user. Similarly, code profiler component 420 may associate a higher level of certainty with a first concrete unit test, for a particular portion of code, than a second concrete test for the particular portion of code based on a number of factors. The factors may include, for example, the quantity of times that the particular portion of code has been executed with the input values, whether the concrete test is based on information requested from the user, etc. As an example, assume that the first concrete unit test is based on a first set of input values, which achieves a first output value. Assume further that the second concrete unit test is based on a second set of input values, which achieves a second output value. Lastly, assume that the particular portion of code has been executed with the first set of input values and achieved the first output value 1,000 times, while the particular portion of code has been executed with the second set of input values and achieved the second output value 40 times. In this example, code profiler component 420 may associate a higher level of certainty with the first concrete test than the second concrete test.

Test executor component 425 may execute a unit test associated with a portion of code. For example, test executor component 425 may receive, from decider component 410, an indication that a unit test is to be executed for the portion of code. Test executor component 425 may, based on the indication, retrieve, for example, from data structure 215, lines of code associated with the unit test. In one example, test executor 425 may use levels of certainty, associated with two or more unit tests, to select a unit test with a highest level of certainty and may execute the selected unit test. Test executor component 425 may, for example, execute the portion of code to generate a test result. Test executor component 425 may provide a notification when the test result indicates that a potential condition is associated with the portion of code. Test executor component 425 may provide recommended instructions, which can be selected by the user, to cause computing device 205 to modify the portion of code to remedy the condition.

Although FIG. 4 shows example functional components of computing device 205, in some implementations, computing device 205 may include additional functional components, fewer functional components, different functional components, or differently arranged functional components than those depicted in FIG. 4. Additionally, or alternatively, one or more functional components of computing device 205 may perform one or more tasks described as being performed by one or more other functional components of computing device 205.

Figure 5:
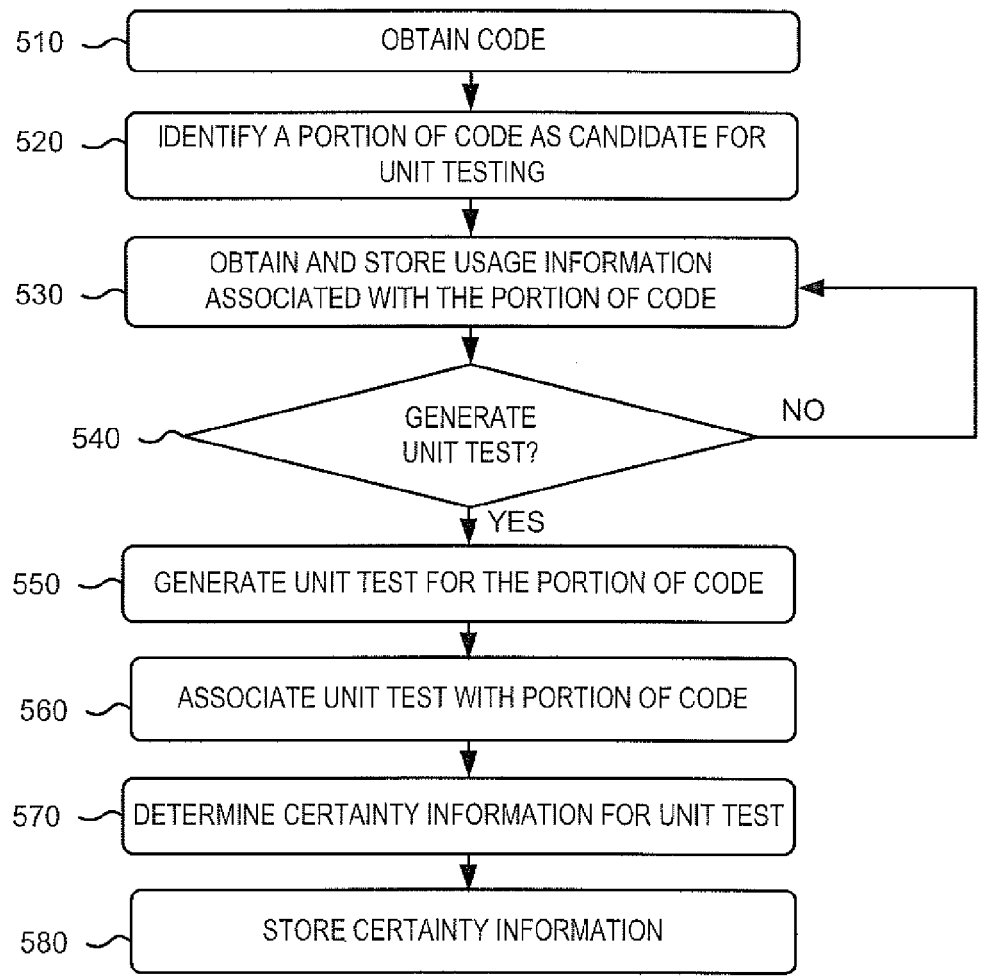
FIG. 5 is a flow chart of an example process relating to generation of a unit test.

FIG. 5 is a flow chart of an example process 500 relating to the generation of a unit test. In some implementations, process 500 may be performed by computing device 205. In some implementations, process 500 may be performed by a device, or group of devices, separate from, or in combination with, computing device 205. FIG. 6 is an example data structure 600 that stores usage information associated with a portion of code. Data structure 600 may be stored by data structure 215. In the description below, all or a portion of process 500 will be described with references to data structure 600 of FIG. 6.

As shown in FIG. 5, process 500 may include obtaining code (block 510). For example, computing device 205 may receive a request, from a user of computing device 205, to access code. Computing device 205 may, in response to the request, retrieve the code from a memory associated with computing device 205 and/or from data structure 215. In one example, computing device 205 may provide, for display, a user interface that depicts all or a portion of the code. The code may include lines of code that include functions, variables, etc.

Process 500 may also include identifying a portion of code as a candidate for unit testing (block 520). For example, computing device 205 (e.g., decider component 410) may identify a portion of code, as a candidate for unit testing, based on the user editing the portion of code. Additionally, or alternatively, computing device 205 may identify a portion of code, as a candidate for unit testing, based on the portion of code being previously edited and executed, either directly or indirectly, a particular quantity of times; the portion of code being shared with other users; the portion of code being submitted to a file exchange (e.g., a community code repository or another location where code is shared) that allows users to obtain and use code from other users; the portion of code being associated with more than a particular amount of documentation; the portion of the code being published or ready for publishing; the portion of the code being associated with metrics having at least a particular level of complexity; etc. Additionally, or alternatively, computing device 205 may identify the portion of code based on information from the user. For example, computing device 205 may receive information, from the user, specifying that a unit test is to be generated for the portion of code. Other manners of identifying a portion of code may additionally or alternatively be used.

Process 500 may further include obtaining usage information for the portion of code (block 530). For example, computing device 205 (e.g., usage monitor component 405) may monitor the execution of the portion of code, whenever the portion of code is directly executed on behalf of the user or when the portion of code is executed as a result of being called by another portion of the code. Computing device 205 may obtain usage information relating to the execution. The usage information may include, for example, information relating to a set of input values (referred to hereinafter as "input values") for the portion of code, and information relating to the output value of the portion of code when the portion of code is executed using the input values. The set of input values may include zero or more input values.

Additionally, or alternatively, the usage information may include information relating to usage of resources when the portion of code was executed (e.g., a quantity of computations performed, clock cycles used, processing capacity used, run time expended, a quantity of memory used (e.g., peak memory usage, average memory usage, net memory usage, etc.), a number of calls made to another portion of code within the code, etc., associated with executing the portion of the code). Additionally, or alternatively, the usage information may include information relating to instances when the execution of the portion of code failed. Additionally, or alternatively, the usage information may include information from the user, such as information that the user provided relating to the portion of code. The information from the user may include, for example, input values, a data type of the input values, etc. In some implementations, computing device 205 may request the information from the user. The usage information may include other information that may facilitate the debugging of the portion of code.

In some implementations, computing device 205 may obtain usage information relating to another portion of the code. For example, computing device 205 may identify another portion of code that calls the portion of code and/or is called by the portion of code. Computing device 205 may, based on identifying the other portion of code, retrieve other usage information associated with the other portion of code.

Process 500 may further include storing the usage information (block 530). For example, computing device 205 (e.g., usage monitor component 405) may store the obtained usage information in a memory, such as data structure 215. As an example, and with reference to FIG. 6, data structure 600, which may be stored in data structure 215, may include a collection of fields, such as a code information field 605, a portion information field 610, an input field 615, a source field 620, an output field 625, a function field 630, an execution quantity field 635, a resource field 640, a time field 645, a test field 650, and a certainty score field 660. Particular fields, shown with respect to data structure 600, are included for explanatory purposes. In other implementations, there may be additional fields, fewer fields, different fields, or differently arranged fields than are shown with respect to FIG. 6.

Code information field 605 may, for example, store information that identifies particular code (e.g., a file name, a code identifier, etc.). Portion information field 610 may, for example, store information that identifies a particular portion of the code identified in field 605 (e.g., an identifier associated with a line of code, a name of a function, etc.). Input field 615 may store one or more input values that were used during an execution of the portion of the code by computing device 205. The input values may, for example, correspond to one or more input variables associated with the portion of the code. In one example, input field 615 may store one or more input values that are provided by a user via a command line. Additionally, or alternatively, input field 615 may store input values that are automatically generated by computing device 205 when executing the portion of the code (e.g., generated from another portion of the code). Additionally, or alternatively, input field 615 may store input values, generated by computing device 205, for use in one or more dynamic unit tests. Source field 620 may store information that identifies whether the input values, identified by input field 615, are provided by the user or generated by computing device 205.

Output field 625 may store one or more output values that are generated as a result of executing the portion of the code using the input values identified by input field 615. The one or more output values may, for example, correspond to one or more output variables associated with the portion of code. Function field 630 may store information relating to the portion of code. In one example, function field 630 may store one or more lines of code within the portion of code (e.g., a particular version of the function that is within the portion of code when the portion of code was executed).

Execution quantity field 635 may store information that identifies a quantity of times that the portion of code has been executed. Resource field 640 may store resource information that identifies resources used, by computing device 205, when executing the portion of code. For example, resource field 640 may store resource information that identifies a quantity of computations performed, clock cycles used, processor capacity used, run time expended, a quantity of memory used, etc., associated with executing the portion of code.

Time field 645 may store a time value when the portion of code is executed. For example, time field 645 may store information that identifies a date and/or time (e.g., hours, minutes, seconds, etc.) when the portion of code is executed. In some implementations, time field 645 may store information identifying a date and/or time associated with each time the portion of code was executed. In some implementations, time field 645 may store information identifying a date and/or time associated with only the last time the portion of code was executed. Test field 650 may store information that identifies whether a unit test has been generated for the portion of code. When a unit test has been generated for the portion of code, test field 650 may store information that identifies a type of unit test (e.g., a concrete unit test, a dynamic unit test, etc.) associated with the portion of the code. Additionally, or alternatively, test field 650 may store information identifying the unit test, such as a link to where the code that corresponds to the unit test is stored, or simply a flag indicating whether or not a unit test has been generated.

Certainty score field 660 may store information identifying a level of certainty associated with the unit test stored in field 650. In some implementations, computing device 205 (e.g., code profiler component 420) may generate a certainty score for each unit test identified in data structure 600. Further details regarding the generation of a certainty score are provided below.

Computing device 205 may create an entry or update an entry in data structure 600 each time that the portion of the code is executed. If the input values used to execute the function have changed with respect to another input value (e.g., a previous input value) or if the output value, obtained by executing the portion of the code using previously used input values, is different, computing device 205 may create a new entry in data structure 600 for the portion of the code. If the input values match those that have been previously used in execution of the portion of the code and the output value remains the same for those input values, computing device 205 may simply update an existing entry in data structure 600. Ellipse 662 is an example of a new entry created in data structure 600 and ellipses 664-670 are examples of existing entries in data structure 600.

Returning to FIG. 5, process 500 may include determining whether to generate a unit test (block 540). For example, computing device 205 (e.g., decider component 410) may monitor the information stored in data structure 600. Once enough information has been stored in data structure 600 to indicate a trend with respect to the functionality of the portion of code, computing device 205 may determine that a unit test should be generated for the portion of code. In some implementations, computing device 205 may make the decision to generate a unit test based on the portion of code being executed more than a particular quantity of times with the same inputs and achieving the same output. Thus, if the portion of code is executed more than the particular quantity of times, computing device 205 may determine that a unit test should be generated for the portion of code.

Computing device 205 may determine that a unit test is to be generated based on other factors. For example, in some implementations, computing device 205 may determine whether to generate a unit test based on information from a user. For example, after execution of the portion of code, computing device 205 may provide a user interface, to the user, requesting information relating to the portion of code. The requested information may include, for example, permissible input values, a range of permissible input values, one or more permissible data types for the input values, and/or other information that may facilitate an understanding as to how the portion of code is to operate. In some implementations, the decision as to whether to generate a unit test may be based on an identity of the user who is executing the portion of code. For example, assume that a first user created the portion of code. If computing device 205 determines that a second, different user is causing computing device 205 to execute the portion of code, computing device 205 may not collect usage information relating to the execution of the portion of code and may not generate a unit test for the portion of code being executed by the second user.

When a unit test is not to be generated (block 540—NO), process 500 may return to block 530 with computing device 205 obtaining and storing additional usage information for the portion of code. If, on the other hand, a unit test is to be generated (block 540—YES), process 500 may include generating a unit test for the portion of code (block 550). For example, computing device 205 (e.g., test generator component 415) may generate a unit test for the portion of code. In one example, computing device 205 may generate lines of code for the unit test that, when executed, enable computing device 205 to execute the unit test to determine whether a condition is associated with the portion of code. The following code is an example of code that may be generated for a unit test:

```
function AdditionRoutineTest
% Setup
inputs={2, 3};
% Exercise
result=AdditionRoutine(inputs{:});
% Verify
assert(result==5);
% No Teardown needed.
```

In this example, execution of the unit test causes input values of 2 and 3 to be used in connection with a function, called AdditionRoutine. Computing device 205 may compare the value of output of the function, called "result," to an expected output value, 5.

In some implementations, computing device 205 may generate a concrete unit test. The concrete unit test may be based on input values provided by the user (e.g., via a command line) and an output value that has been consistently generated by executing the portion of code based on the input values. Thus, the concrete test tests the portion of code to ensure that when the portion of code is executed with the input values, the output value is obtained. In some implementations, the output value may be an error condition. For example, computing device 205 may also generate a concrete unit test based on a particular set of input values, provided by the user, that, when used in the execution of the portion of code, causes an error condition to be consistently generated. Thus, computing device 205 may generate concrete unit tests, for sets of input values, which produce desired output values and/or error conditions.

Computing device 205 may associate the concrete unit test with the portion of code. For example, computing device 205 may store, in a data structure (e.g., data structure 600 of FIG. 6), information identifying the concrete unit test in association with the input values and the output value. With reference to FIG. 6, computing device 205 has generated concrete unit tests for entries identified by ellipses 664 and 666.

Additionally, or alternatively, computing device 205 may generate a dynamic unit test. The dynamic unit test may be based on input values that were not provided by the user, but instead, were generated by computing device 205 to test the functionality of the portion of code. Similar to the concrete test, computing device 205 may generate dynamic unit tests, for sets of input values, which produce output values and/or error conditions. Computing device 205 may associate the dynamic unit test with the portion of code. For example, computing device 205 may store, in a data structure (e.g., data structure 600 of FIG. 6), information identifying the dynamic unit test in association with the input values, used for the dynamic unit test, and the output value and/or error condition obtained based on executing the portion of code with the input values. With reference to FIG. 6, computing device 205 has generated dynamic unit tests for entries identified by ellipses 668 and 670.

In some implementations, computing device 205 may identify a unit test that is associated with another portion of code that calls the portion of code or is called by the portion of code. Computing device 205 may associate the identified unit test with the portion of code.

Process 500 may also include associating the generated unit test with the portion of code (block 560). For example, computing device 205 (e.g., test generator 415) may associate the generated unit test with information identifying the portion of code. As an example and with reference to FIG. 6, computing device 205 may store the code for the unit test or information identifying the unit test, such as a link to a storage location of the code for the unit test, in test field 650.

Process 500 may further include determining certainty information for the unit test (block 570). For example, computing device 205 (e.g., code profiler component 420) may generate certainty information for the unit test. In some implementations, computing device 205 may generate a certainty score based on one or more factors relating to the unit test. As an example and with reference to FIG. 6, the one or more factors may include information indicating whether the input values, in input field 615, were provided by the user (as designated by source field 620); the quantity of times that the input values, in input field 615, were used during an execution of the portion of code and resulted in the same output identified in output field 625 (as designated by execution quantity field 635); and/or one or more other factors that may allow for a level certainty of the unit test to be determined. In essence, the certainty score may reflect the level of certainty that the unit test accurately reflects the functioning of the portion of code.

In some implementations, computing device 205 may generate a first score based on the information in source field 620 and a second score based on the value in execution quantity field 635. With respect to the first score, computing device 205 may, for example, generate a higher first score for concrete unit tests than for dynamic unit tests. With respect to the second score, computing device 205 may generate a higher score for a unit test that is associated with a larger quantity of executions (e.g., identified by execution quantity field 635) than a unit test that is associated with a smaller quantity of executions.

In some implementations, computing device 205 may generate a total score for the unit test based on a combination of the first score and the second score. In some implementations, computing device 205 may generate a total score for the unit test based on a weighted combination of the first score and the second score. For example, computing device 205 may assign a weight value to the first score and the second score. The weight values may differ—in other words, the amount that each of the first score and the second score contributes to the total score may vary.

By way of example, and with reference to FIG. 6, computing device 205 may generate a higher total score for the concrete unit test, identified by ellipse 664, than for the concrete unit test, identified ellipse 666, since the concrete unit test identified by ellipse 664, has been executed more times than the concrete unit test identified by ellipse 666. Similarly, computing device 205 may generate a higher total score for the dynamic unit test, identified by ellipse 668, than for the dynamic unit test, identified ellipse 670, since the dynamic unit test identified by ellipse 668, has been executed more times than the dynamic unit test identified by ellipse 670. As another example, computing device 205 may generate a higher total score for the concrete unit test, identified by ellipse 666, than for the dynamic unit test, identified ellipse 668. In this situation, both unit tests have been executed the same quantity of times. However, computing device 205 may assign a higher score to the concrete unit test than the dynamic unit test since the concrete unit test is based input values that were provided by the user.

Returning to FIG. 5, process 500 may include storing the certainty information (block 580). For example, computing device 205 (e.g., code profiler 420) may store the certainty information (e.g., the total score) in a data structure, such as in field 660 of data structure 600. In some implementations, computing device 205 may update the certainty information for a unit test each time the unit test is executed, each time additional usage information is received for a particular set of input values and output value, and/or in other situations.

While FIG. 5 shows process 500 as including a particular quantity and arrangement of blocks, in some implementations, process 500 may include fewer blocks, additional blocks, or a different arrangement of blocks. Additionally, or alternatively, some of the blocks may be performed in parallel.

Figures 8A, 8B:
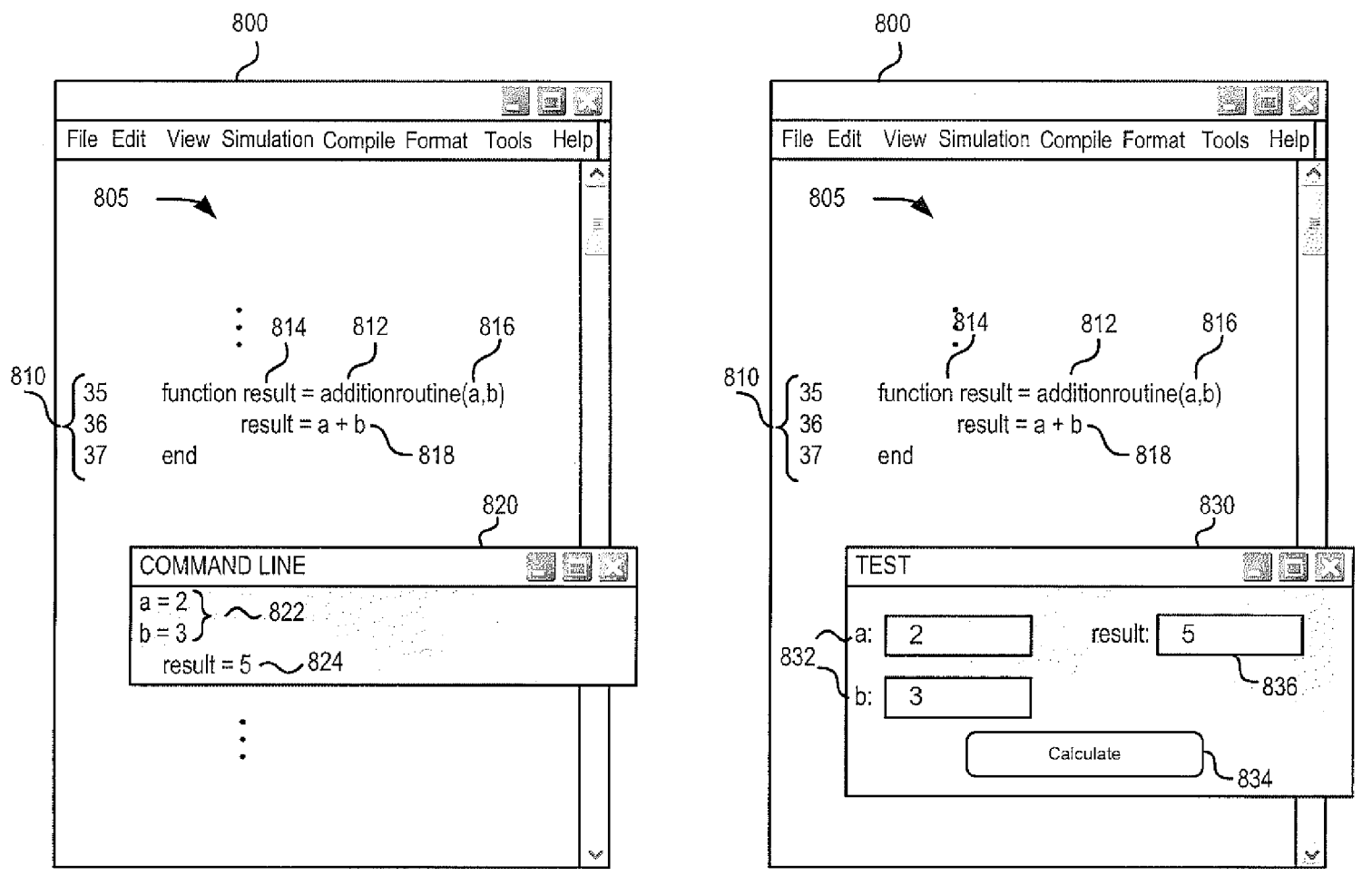
Figure 8C:
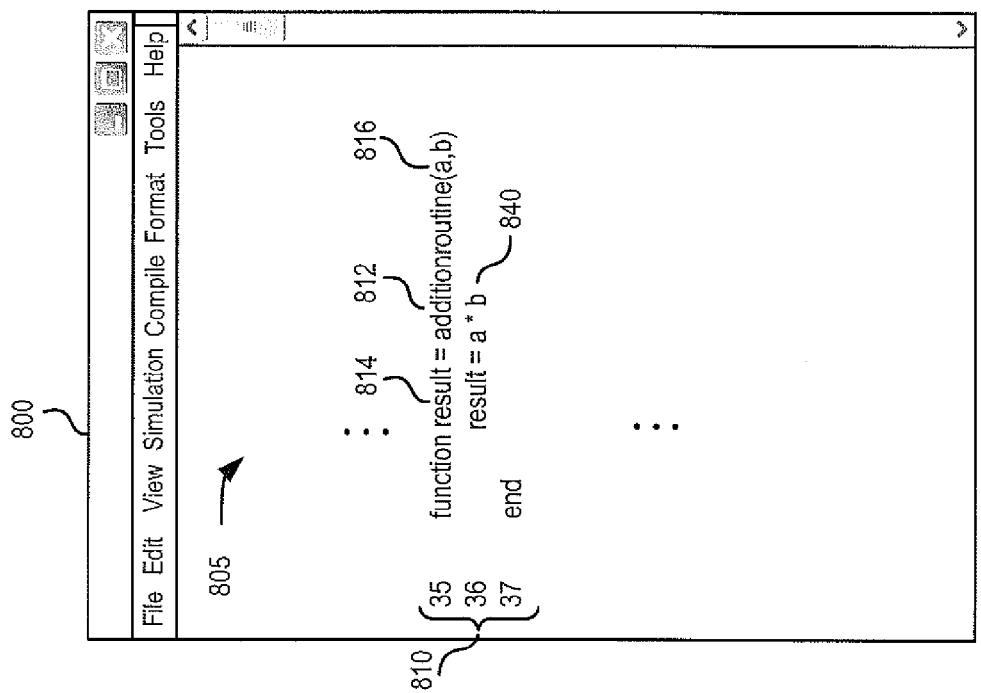

FIG. 7 is a flow chart of an example process 700 relating to executing a unit test. In some implementations, process 700 may be performed by computing device 205. Alternatively, all or a portion of process 700 may be performed by a device, or group of devices, separate from, or in combination with, computing device 205. FIGS. 8A-8C are example user interfaces via which a user may interact with a portion of code. FIGS. 9A-9E are example user interfaces that may be provided to a user in connection with the execution of a unit test. In the description below, all or a portion of process 700 will be described with references to data structure 600 of FIG. 6, the user interfaces of FIGS. 8A and 8B, and the user interfaces of FIGS. 9A-9E.

While the following process focuses on executing unit tests based on a portion of code being modified, implementations described herein are not limited to this situation. Other events may cause unit tests to be executed in other implementations.

As shown in FIG. 7, process 700 may include determining whether a portion of code has changed (block 710). For example, a user may cause computing device 205 to retrieve code from a storage location, such as a memory within computing device 205, data structure 215, or from another and possibly remote location. Computing device 205 may provide, for display, a user interface that depicts all or a portion of the code. Once displayed, the user may interact with the code, for example, by adding one or more new portions of code to the code, executing all or a portion of the code, modifying one or more portions of the code, etc. Computing device 205 may monitor all of the user's interactions with the code, including the execution of all or a portion of the code and any modifications made to the code.

For example, as shown in FIG. 8A, user interface 800 may include code 805. Code 805 may include a portion 810. Portion 810 may include one or more lines of code (e.g., labeled as lines 35, 36, and 37). A first line of code (i.e., line 35) may identify function 812 (e.g., additionroutine(a,b)), an output variable 814 (e.g., result), and/or input variables 816 (e.g., a and b) associated with function 812. A second line of code (i.e., line 36), when executed by computing device 205, may implement function 812 based on an operation 818 (e.g., result=a+b). To execute portion 810, computing device 205 may, for example, provide a command line 820 that enables a user to provide input values 822, associated with input variables 816 (e.g., a=2, b=3). Upon entering input values 822 via command line 820, computing device 205 executes portion 810, using input values 822, to generate an output value 824 associated with output variable 814 (e.g., result=5). Additionally, or alternatively, computing device 205 may, as shown in FIG. 8B, provide a user interface 830 that allows the user to test portion 810. As shown, user interface 830 may include input value fields 832, a calculate button 834, and an output value field 836. Input value fields 832 may allow the user to provide input values, associated with input variables 816 (e.g., a=2, b=3). Calculate button 834 may cause, upon selection, computing device 205 to execute portion 810, using the input values in field 832. Output value field 836 may display the output value, corresponding to output variable 818, obtained based on executing portion 810 using the input value from field 832.

Computing device 205 (e.g., usage monitor component 405) may monitor a user's interaction with the code. For example, assume that the user has modified portion 810 by modifying operation 818. For example, the user may replace the addition operation with a multiplication operation to create a new operation 840, as shown in FIG. 8C. Computing device 205 may detect when the user has modified portion 810 of code 805 to create new operation 840.

Returning to FIG. 7, when a portion of the code has not changed (block 710—NO), process 700 may return to monitoring a user's interaction with the code (block 710). If, on the other hand, a portion of the code has changed (block 710—YES), process 700 may further include identifying unit tests relating to the portion of the code (block 715). For example, computing device 205 (e.g., decider component 410) may identify unit tests associated with the portion of code. In some implementations, computing device 205 may identify the unit tests from data structure 600 (FIG. 6). For example, computing device 205 may use information identifying the code and information identifying the portion of code to access a portion of data structure 600 that corresponds to that code and that portion of code (e.g., by matching the information identifying the code to information stored in code information field 605 and matching the information identifying the portion of code to information stored in portion field 610). Computing device 205 may then reference test field 650 to identify unit tests associated with the portion of code.

Process 700 may further include prioritizing the unit tests based on the certainty information with which the unit tests are associated (block 720). For example, computing device 205 (e.g., decider component 410) may obtain the certainty score for each unit test and prioritize the unit tests based on the certainty scores, such that a unit test with a higher certainty score is given priority over a unit test with a lower certainty score. With reference to the example certainty scores given in FIG. 6, computing device 205 would prioritize the unit tests in the order shown (with the concrete test having a certainty score of 100 being given priority over the other unit tests).

Process 700 may include executing the highest priority unit test (block 725). For example, computing device 205 (e.g., test executor component 425) may cause the highest priority unit test to be executed in connection with the modified portion of code. To execute the unit test, computing device 205 may use information from test field 650 (FIG. 6) to retrieve the code corresponding to the unit test. Once retrieved, computing device 205 may execute the code to perform the unit test in connection with the modified portion of code. As an example, and with reference to FIG. 6, execution of the unit test may cause computing device 205 to execute the modified portion of code using the input values, within ellipse 664, identified in input field 615. Computing device 205 may obtain usage information based on the execution of the modified portion of code. The usage information may include, for example, an output value obtained based on the execution, and/or other types of information relating to the execution of the modified portion of code (e.g., such as resource information).

Process 700 may include determining whether the unit test failed (block 730). For example, computing device 205 (e.g., test executor component 425) may analyze the usage information, obtained in connection with the execution of the unit test, and may determine whether or not the unit test failed based on the analysis. The unit test may fail, for example, if the modification to the portion of code causes the portion of code to perform differently than the portion of code performed before the modification. For example, if the output value obtained based on executing the modified portion of code does not match the expected output value, stored in output field 625 (FIG. 6), computing device 205 may determine that the unit test failed and that the modification to the portion of code may have potentially introduced a bug into the code. As an example, the modification to the portion of code may have caused the code to perform in an unintended manner.

Additionally, or alternatively, if any of the obtained resource information (e.g., a quantity of computations, clock cycles, memory used, run time, etc.) varies, by more than a threshold amount, from the resource information stored in resource field 640 (FIG. 6), computing device 205 may determine that the unit test failed. As one example, assume that the resource information, stored in connection with a unit test, indicates that the execution of the portion of code consumes a first amount of memory. Assume further that the resource information, obtained by executing the modified portion of the code, indicates that the execution of the modified portion of code consumes a second amount of memory. If the second amount of memory is greater or less than the first amount of memory, by a threshold amount, computing device 205 may determine that the unit test failed and that the modification to the portion of code may have potentially introduced a bug into the code.

Additionally, or alternatively, if the quantity of calls to other portions of the code, made during execution of the modified portion of the code, varies, by more than a threshold amount, from the quantity of calls, made during execution of the portion of the code, computing device 205 may determine that the unit test failed. As one example, assume that usage information, obtained in connection with the execution of the portion of code, indicates a first quantity of calls to other portions of the code. Assume further that the usage information, obtained by executing the modified portion of the code, indicates a second quantity of calls to other portions of the code. If the second quantity of calls is different than the first quantity of calls, by a threshold amount, computing device 205 may determine that the unit test failed and that the modification to the portion of code may have potentially introduced a bug into the code.

Computing device 205 may use other factors, than those given above, in determining whether a unit test failed.

When the unit test has been determined to succeed (block 730—NO), process 700 may include determining whether all of the unit tests have been executed (block 735). For example, computing device 205 (e.g., test executor component 425) may determine whether all of the unit tests associated with the portion of code have been executed. All the unit tests may correspond to every unit test that has been generated for the portion of code or only those unit tests having certainty scores above a particular threshold.

If all of the unit tests have been executed (block 735—YES), process 700 may return to block 710 with computing device 205 monitoring the user's interaction with the code. If, on the other hand, all of the unit tests have not been executed (block 735—NO), process 700 may include executing the next highest priority unit test (block 740). For example, computing device 205 (e.g., test executor component 425) may cause the next highest priority unit test to be executed in connection with the modified portion of code. Computing device 205 may perform the execution of the next highest priority unit test in a manner similar to that described above with respect to block 725. For example, computing device 205 may use information from test field 650 (FIG. 6) to retrieve the code corresponding to the next highest priority unit test. Once retrieved, computing device 205 may execute the code to execute the next highest priority unit test in connection with the modified portion of code. As an example, and with reference to FIG. 6, execution of the next highest priority unit test may cause computing device 205 to execute the modified portion of code using the input values, within ellipse 666, identified in input field 615, for the next highest priority unit test. Computing device 205 may obtain usage information based on the execution of the modified portion of code. The usage information may include, for example, an output value obtained based on the execution, and/or other types of information relating to the execution of the modified portion of code (e.g., such as resource information).

Process 700 may return to block 730 with a determination of whether the unit test failed. Process 700 may continue in the manner described above with respect to blocks 730, 735, and 740. In those situations when a unit test fails (block 730—YES), process 700 may include notifying the user of a possible condition in connection with the modified portion of code (block 745). For example, computing device 205 (e.g., test executor component 425) may provide, for display, a user interface that indicates that a potential condition is associated with the modified portion of code. The user interface may allow the user to perform an action, such as reverting the modified portion of code back to the prior version of the portion of code, providing replacement code for a section of code that may be associated with a condition, and/or other types of actions. Example interfaces that may be provided to the user are described below in connection with FIGS. 9A-9E. In some implementations, other types of user interfaces with different types of information may be provided.

Figure 9B:
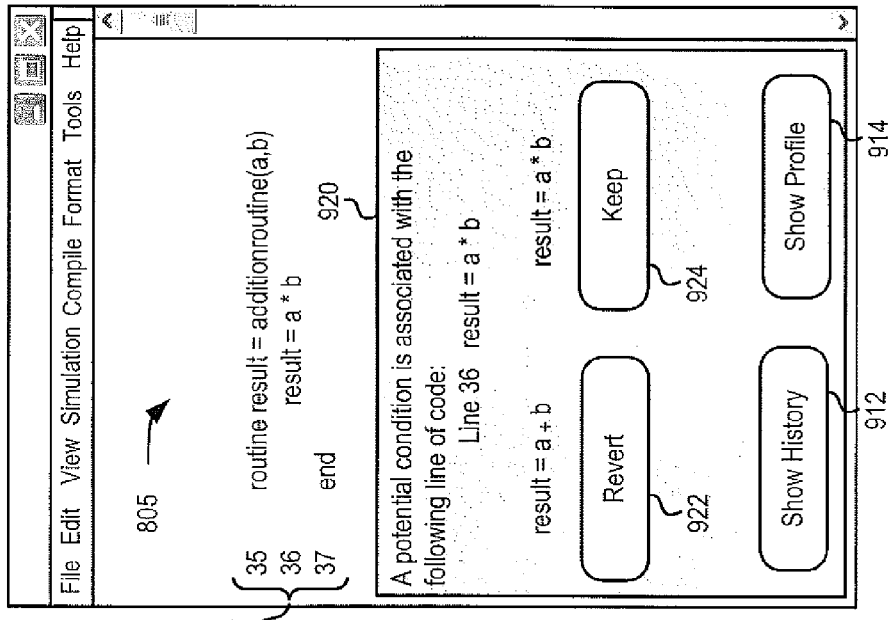
FIGS. 9A-9E are example user interfaces that may be provided to a user in connection with the execution of a unit test.
Figure 9A:
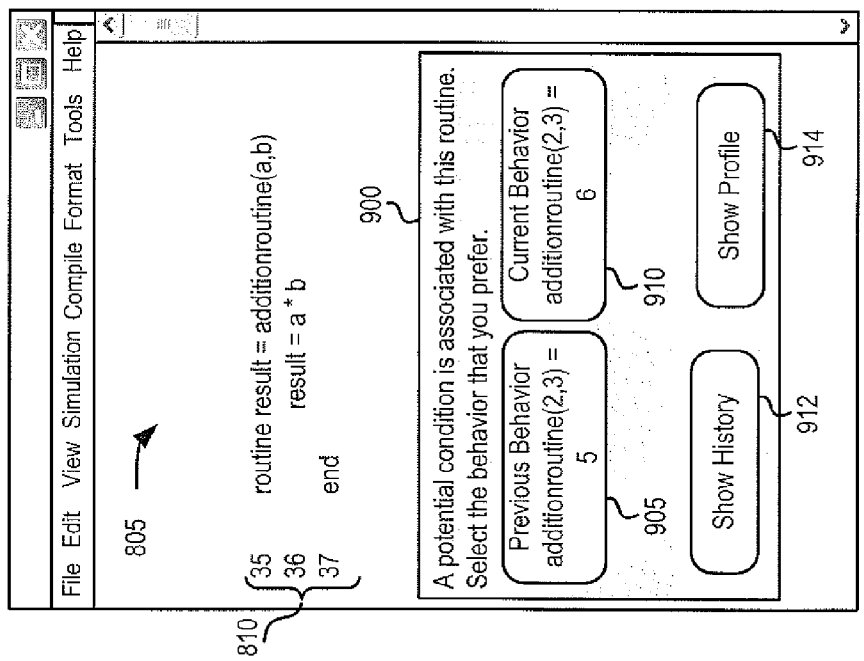

As an example, and with reference to FIG. 9A, user interface 900 may include a previous behavior button 905, a current behavior button 910, a show history button 912, and a show profile button 914. Previous behavior button 905, when selected by a user of computing device 205, may cause computing device 205 to revert portion 810 of code 805 back to a previous version (i.e., to cause the multiplication operation to be changed back to an addition operation). Current behavior button 910, when selected by the user, may cause computing device 205 to leave the current version of portion 810 of code 805 as is (i.e., to leave the multiplication operation in portion 810). In this situation, computing device 205 may update the unit test based on the current behavior of the portion 810 of code 805.

Show history button 912, when selected by the user, may cause computing device 205 to provide a user interface, described below with respect to FIG. 9D, that includes information associated with one or more previous unit tests performed on the portion of code. Show profile button 914, when selected by the user, may cause computing device 205 to provide a user interface, described below with respect to FIG. 9E, that includes a profile associated with the code. The profile may identify a portion of the code with which unit tests are associated, a quantity of conditions associated with the code, resources used when executing the code, etc.

Additionally, or alternatively, computing device 205 may provide, as shown in FIG. 9B, a user interface 920 that may include a notification that identifies a particular section of the portion of code that may include a condition. For example, as shown in FIG. 9B, user interface 920 indicates that a potential condition may be associated with Line 36 of portion 810 of code 805. User interface 920 may also include a revert button 922 and a keep button 924. Revert button 922, when selected by the user, may cause computing device 205 to replace one or more first lines of code, associated with the portion of code, with one or more second lines of code associated with a previous version of the portion of code. Keep button 924, when selected by the user, may preclude computing device 205 from replacing the one or more first lines of code with the one or more second lines of code.

Figure 9D:
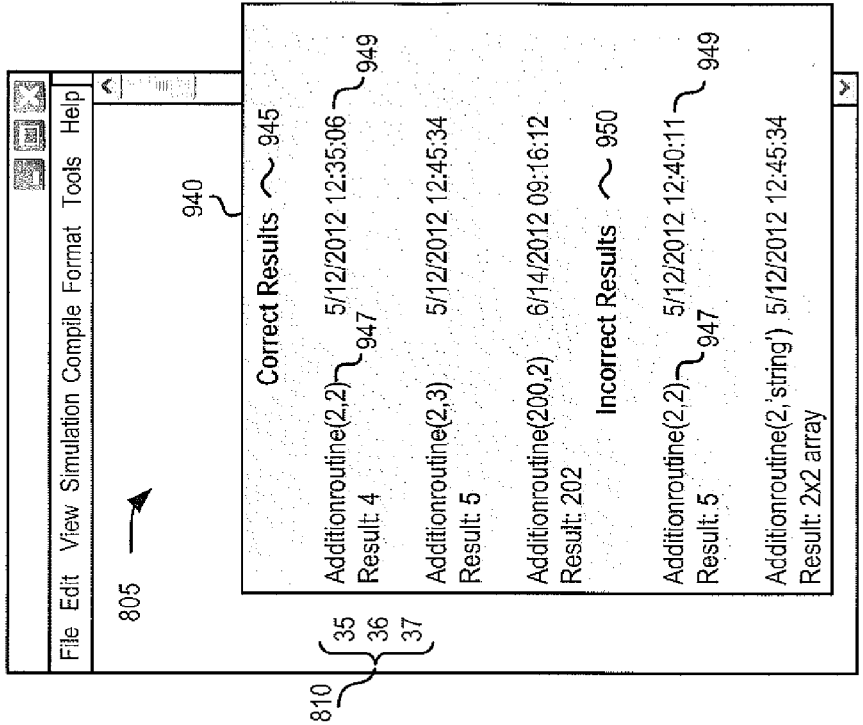
Figure 9C:
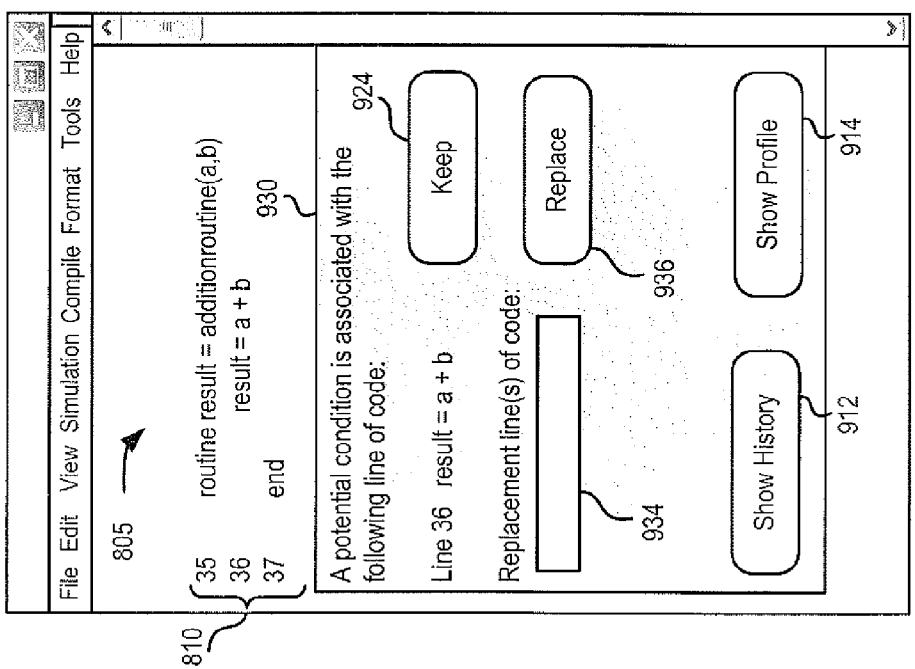

Additionally, or alternatively, computing device 205 may provide, as shown in FIG. 9C, a user interface 930 may include a notification that identified a particular section of the portion of code that may include a condition, in a manner similar to that described above with respect to FIG. 9B. User interface 930 may also include a text box 934 and a replace button 936. Text box 934 may allow a user to provide one or more lines of code. Replace button 936, when selected by the user, may cause computing device 205 to replace one or more lines of code, associated with the portion of code, with the one or more lines of code in text box 934.

FIG. 9D shows a user interface 940 that may be provided in response to selection of show history button 912. As shown in FIG. 9D, user interface 940 may include a correct results section 945 and an incorrect results section 950. Correct results section 945 may include entries that correspond to previously executed unit tests, associated with the portion of code, when a condition was not detected. Each entry may include a code portion field 947 and a test time field 949. Code portion field 947 may include information associated with the portion of code, such as a function (e.g., AdditionRoutine), one or more input values (e.g., 2,2), one or more output values (e.g., result: 4), etc., on which a unit test was performed. Test time field 949 may identify a time, such as a date and/or time (e.g., 5/12/2012 at 12:35:06) when the unit test was performed. Thus, for example, correct results section 945 may include entries that provide test parameters (e.g., function, input values, an output value, a date, a time, etc.) for each unit test, that was executed on the portion of code, that did not result in detecting a condition. Incorrect results section 950 may include entries that correspond to previously executed unit tests, associated with the portion of code, when a condition is detected. The entries may include code portion field 947 and test time field 949 that identify test parameters (e.g., functions, input values, an output value, a date, a time, etc.) for each unit test, that was executed on the portion of code, that resulted in detecting a condition.

Figure 9E:
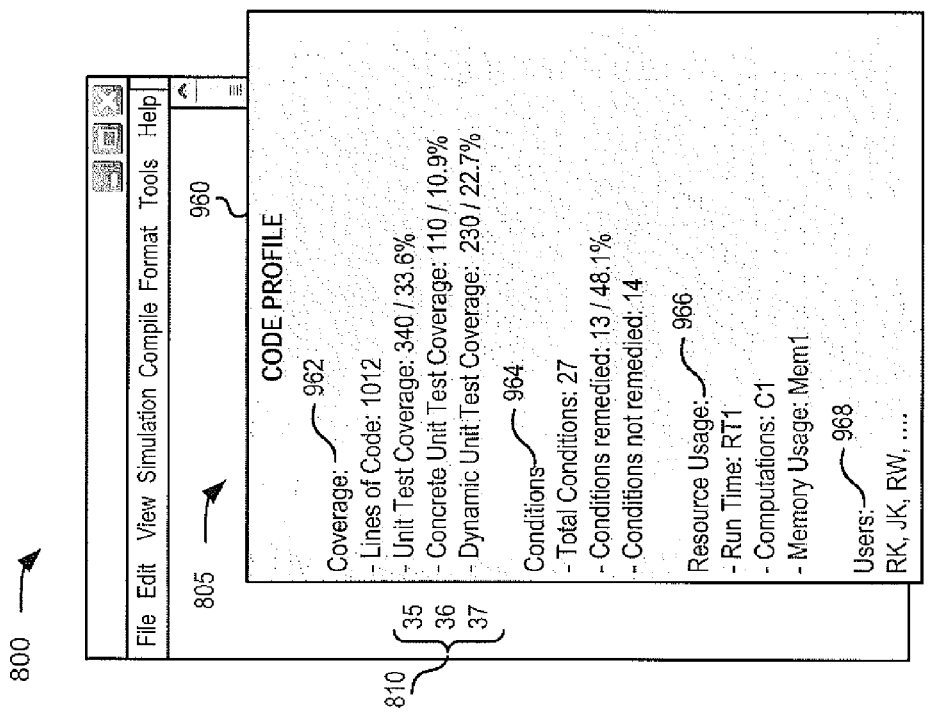

FIG. 9E shows a user interface 960 that may be provided in response to selection of profile button 914. As shown in FIG. 9E, user interface 960 may represent a code profile associated with code 805 being executed by computing device 205. User interface 960 may include a code coverage section 962, a conditions section 964, a resource usage section 966, and a users section 968. Code coverage section 962 may include information that identifies a quantity of lines in code 805 (e.g., shown as 1012 lines of code) and a portion of the code that is covered by unit tests (e.g., shown as 340 lines of code/33.6 percent of the 1012 lines of code). Code coverage field 962 may also, or alternatively, include information that identifies a first portion, of the covered lines of code, for which a concrete unit test has been created (e.g., shown as 110 concrete tests/10.9 percent of the 1012 lines of code). Code coverage field 962 may also, or alternatively, include information that identifies a second portion, of the covered lines of code, for which a dynamic unit test has been created (e.g., shown as 230 concrete tests/22.7 percent of the 1012 lines of code).

Conditions section 964 may include information that identifies a quantity of conditions associated with the code (e.g., shown as 27), a first portion of the quantity of conditions that have been remedied (e.g., shown as 13/48.1 percent of the 27 conditions), a portion of the quantity of conditions that have not been remedied (e.g., shown as 14/51.9 percent of the 27 conditions), etc.

Resource usage section 966 may include information that identifies a run time associated with executing the code (e.g., identified as RT1); a quantity of computations performed when executing the code (e.g., identified as C1); a quantity of memory used when executing the code (e.g., identified as Mem1); etc. User section 968 may store information that identifies one or more users that have authored the code; that are authorized to access the code, modify the code, and/or execute the code; for which a unit test can be generated or executed; etc.

While FIG. 7 shows process 700 as including a particular quantity and arrangement of blocks, in some implementations, process 700 may include fewer blocks, additional blocks, or a different arrangement of blocks. Additionally, or alternatively, some of the blocks may be performed in parallel. For example, while the unit tests were described as being serially executed by computing device 205, implementations described herein are not so limited. In some implementations, two or more unit tests may be executed in parallel.

Systems and/or methods, as described herein, may enable a computing device to automatically generate a unit test to test a portion of code. The systems and/or methods may enable the computing device to automatically execute the unit test to determine whether a condition is associated with the portion of code. The computing device may provide a user interface that includes test results that are generated based on executing the unit test. The user interface may enable the user to provide, to the computing device and via the user interface, an instruction to modify the code to remedy a condition identified by the test results. By generating and executing the unit test in the background, and possibly without the user's knowledge, the user's ability to debug code is improved.

The foregoing description provides illustration and description, but is not intended to be exhaustive or to limit the description to the precise form disclosed. Modifications and variations are possible in light of the above implementations or may be acquired from practice of the implementations. For example, while the above description focused on identifying potential issues with respect to creating and editing code, implementations described herein are not so limited. For example, systems and methods, as described herein, may be equally applicable to creating and editing graphical user interfaces. For example, a computing device may monitor and record a user's interaction and testing of a graphical user interface, such as mouse movements and clicks, keys that were selected from a keyboard, etc. The computing device may create one or more tests for testing the operation of the graphical user interface based on the recorded information. If the user changes the graphical user interface, the computing device may automatically execute the one or more tests and inform the user if the graphical user interface is operating, as a result of the change, in a manner that is different than the graphical user interface was previously operating.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve a component that performs one or more functions. These components may include hardware, such as an ASIC or a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   obtaining usage information relating to an execution of a portion of code,
      the usage information including a set of input values and an output value obtained based on executing the portion of code using the set of input values,
      the set of input values being provided by a user, and
      the obtaining the usage information being performed by a computing device;
   detecting that the portion of code has been executed a particular quantity of times,
      the particular quantity of times being more than one time,
      the detecting being performed by the computing device, and
      the detecting being performed using the set of input values and the output value;
   generating a unit test, for the portion of code, based on detecting that the portion of code has been executed the particular quantity of times with a particular input value resulting in a particular output value each time of the particular quantity of times,
      the unit test being to pass the particular input value to the portion of code, and
      the unit test being to confirm that an output value of calling the portion of code is the same as the particular output value associated with executing the portion of code the particular quantity of times,
      the generating being performed by the computing device;
   detecting a modification to the portion of code,
      the detecting the modification to the portion of code being performed by the computing device;
   executing, based on detecting the modification to the portion of code, the unit test in connection with the modified portion of code,
      the executing being performed by the computing device; and
   providing a notification when the execution of the unit test fails,
      the providing being performed by the computing device.

2. The method of claim 1, further comprising:
   identifying the portion of code, from within the code, based on at least one of:
      the portion of code being previously edited or executed a particular quantity of times,
      the portion of code being shared with one or more users,
      the portion of code being submitted to a file exchange, the portion of code being associated with more than a particular amount of documentation, the portion of the code being published or ready for publishing, or the portion of the code being associated with metrics having at least a particular level of complexity.

3. The method of claim 1, where the usage information further includes information associated with at least one of:

a first period of time associated with executing the portion of code, a first amount of memory used when executing the portion of code, a first amount of computations associated with executing the portion of code, or a first amount of times the portion of code calls, or is called by, one or more other portions of code, associated with the code, and where executing the unit test includes:

obtaining additional usage information, the additional usage information including information associated with at least one of:

a second period of time associated with executing the modified portion of code, a second amount of memory used when executing the modified portion of code, a second amount of computations associated with executing the modified portion of code, or a second amount of times the modified portion of code calls, or is called by, one or more other portions of code.

4. The method of claim 3, further comprising:

determining that the unit test failed when at least one of:

the first period of time differs from the second period of time by more than a first threshold amount, the first amount of memory differs from the second amount of memory by more than a second threshold amount, the first amount of computations differs from the second amount of computations by more than a third threshold amount, or the first amount of times differs from the second amount of times by more than a fourth threshold amount.

5. The method of claim 1, where generating the unit test includes:

generating a plurality of unit tests, and where the method further comprises:

generating a first certainty score for a first unit test of the plurality of unit tests, the first certainty score reflecting a first level of certainty that the first unit test reflects a functionality of the portion of code; and generating a second certainty score for a second unit test of the plurality of unit tests, the second certainty score reflecting a second level of certainty that the second unit test reflects the functionality of the portion of code.

6. The method of claim 5, where executing the unit test includes:

executing the first unit test before executing the second unit test based on the first certainty score and the second certainty score, the first certainty score reflecting a higher level of certainty than the level of certainty reflected by the second certainty score.

7. The method of claim 1, further comprising:

generating a plurality of unit tests, each unit test, of the plurality of unit tests, being associated with a certainty score, where executing the unit test includes:

executing the plurality of unit tests in an order determined by the certainty scores.

8. The method of claim 1, further comprising:

generating a certainty score for the unit test, the certainty score reflecting a level of certainty that the unit test reflects a functionality of the portion of code, and the certainty score being based on:

whether the set of input values were provided by the user, and a quantity of times that the portion of code has been executed, where executing the unit test includes:

determining whether to execute the unit test before executing another unit test based on the certainty score.

9. The method of claim 1, where the notification includes at least one of:

information identifying one or more lines of code, within the modified portion of code, that caused the unit test to fail, a first object that, when selected, causes the modified portion of code to revert back to the portion of code, or a second object that, when selected, causes user-provided one or more lines of code to replace the identified one or more lines of code.

10. A computing device comprising:

a processor programmed with instructions to:

obtain usage information relating to an execution of a function within code, the usage information including a set of input values and an output value obtained based on executing the function using the set of input values, the set of input values being provided by a user;

determine that the function has been executed a particular quantity of times, the particular quantity of times being more than one time, the function being determined to be executed the particular quantity of times based on the set of input values and the output value;

generate a unit test, for the function, based on determining that the function has been executed the particular quantity of times with a particular input value resulting in a particular output value each time of the particular quantity of times, the unit test being to pass the particular input value to the function, and the unit test being to confirm that an output value of calling the function is the same as the particular output value associated with executing the function the particular quantity of times;

detect a modification to the function; and execute, based on detecting the modification to the function, the unit test in connection with the modified function.

11. The computing device of claim 10, where the processor is further to:

use the unit test to determine whether the modification to the function has caused the function to perform differently than the function performed prior to the modification.

12. The computing device of claim 11, where the processor is further to:

provide, when the modification to the function has caused the function to perform differently than the function performed prior to the modification, a notification, the notification including at least one of:
information identifying one or more lines of code, within the modified function, that caused the function to perform differently,
a first object that, when selected, causes the modified function to revert back to the function, or
a second object that, when selected, causes a user-provided one or more lines of code to replace the identified one or more lines of code.

13. The computing device of claim 11, where the processor is further to:
provide no notification when the modification to the function has not caused the function to perform differently than the function performed prior to the modification.

14. The computing device of claim 10, where the processor is further to:
generate a certainty score for the unit test,
the certainty score reflecting a level of certainty that the unit test reflects a functionality of the function, and
the certainty score being based on:
whether the set of input values were provided by the user, and
a quantity of times that the function has been executed, and
where, when using the unit test, the processor is further to:
determine whether to execute the unit test before executing another unit test based on the certainty score.

15. The computing device of claim 10, where the processor is further to:
identify the function, from within the code, based on at least one of:
the function being previously edited or executed another particular quantity of times,
the function being shared with one or more users,
the function being submitted to a file exchange,
the function being associated with more than a particular amount of documentation,
the function being published or ready for publishing, or
the function being associated with metrics having at least a particular level of complexity.

16. A non-transitory computer-readable medium for storing instructions, the instructions comprising:
one or more instructions that, when executed by a processor of a computing device, cause the processor to:
detect a modification to a function within code,
the function being associated with a set of input values and a first output value that is obtained based on executing the function using the set of input values,
the set of input values being provided by a user;
receive information indicating that the function has been executed a particular quantity of times,
the particular quantity of times being more than one time, and
the function being executed based on the set of input values;
identify a unit test based on detecting the modification to the function,
the unit test being further identified based on detecting that the function has been executed the particular quantity of times with a particular input value resulting in a particular output value each time of the particular quantity of times,
the unit test being to pass the particular input value to the function, and
the unit test being to confirm that an output value of calling the function is the same as the particular output value associated with executing the function the particular quantity of times;
execute the identified unit test in connection with the modified function to cause the modified function to be executed using the set of input values to obtain a second output value; and
provide a notification when the second output value does not match the first output value.

17. The computer-readable medium of claim 16, where the one or more instructions to cause the processor to identify a unit test include:
one or more instructions to:
identify a first unit test and a second unit test,
the first unit test being associated with a first certainty score,
the first certainty score reflecting a first level of certainty that the first unit test reflects a functionality of the function, and
the second unit test being associated with a second certainty score,
the second certainty score reflecting a second level of certainty that the second unit test reflects the functionality of the function, and
the second level of certainty being higher than the first level of certainty,
where the one or more instructions to cause the processor to execute the identified unit test include:
one or more instructions to:
execute the second unit test before executing the first unit test based on the second level of certainty being higher than the first level of certainty.

18. The computer-readable medium of claim 16, where the instructions further comprise:
one or more instructions to:
generate a certainty score for the identified unit test,
the certainty score reflecting a level of certainty that the identified unit test reflects a functionality of the function, and
the certainty score being based on:
whether the set of input values were provided by the user, and
a quantity of times that the function has been executed, and
where the one or more instructions to cause the processor to execute the identified unit test include:
one or more instructions to determine whether to execute the identified unit test before executing another unit test based on the certainty score.

19. The computer-readable medium of claim 16, where the notification includes at least one of:
information identifying one or more lines of code, within the modified function, that caused the second output value not to match the first output value,
a first object that, when selected, causes the modified function to revert back to the function, or
a second object that, when selected, causes a user-provided one or more lines of code to replace the identified one or more lines of code.

20. The computer-readable medium of claim 16, where the instructions further include:
one or more instructions to:
receive a request for a results of past executions of the function; and provide, based on receiving the request, a user interface that includes at least one:
- a list of past results when the function operated properly when executed, or
- a list of past results when the function operated improperly when executed.

21. The computer-readable medium of claim 16, where the instructions further include:
one or more instructions to:
- receive information, from the user, identifying the modified function; and
- update the identified unit test based on receiving the information identifying the modified function.

* * * * *